United States Patent [19]

Roberts

[11] Patent Number: 5,192,109

[45] Date of Patent: Mar. 9, 1993

[54] GOLF CART WINDSHIELD

[75] Inventor: Marc W. Roberts, Tampa, Fla.

[73] Assignee: Larry W. Carroll, Tampa, Fla.

[21] Appl. No.: 875,690

[22] Filed: Apr. 28, 1992

[51] Int. Cl.⁵ .............................................. B60J 1/06
[52] U.S. Cl. .................................... 296/84.1; 296/89; 296/96.21; 49/449; 280/DIG. 5; 292/87
[58] Field of Search ............. 296/84.1, 89, 201, 96.21, 296/77.1, 79, 80; 49/449; 280/DIG. 5; 52/207; 292/80, 87

[56] References Cited

U.S. PATENT DOCUMENTS

| | | | |
|---|---|---|---|
| 832,505 | 10/1906 | Sawyer | 292/87 |
| 1,110,729 | 9/1914 | Townsend. | |
| 1,392,880 | 10/1921 | Simpson | 296/89 |
| 1,393,239 | 10/1921 | Morriss | 296/89 |
| 1,891,765 | 12/1932 | Herron | 296/89 |
| 4,072,338 | 2/1978 | Lawrence | 296/28 C |
| 4,343,503 | 8/1982 | Samuelson et al. | 296/96.21 |
| 4,353,590 | 11/1982 | Wei-Chuan | 296/78.1 |
| 4,792,175 | 12/1988 | Gerber | 296/79 |

FOREIGN PATENT DOCUMENTS

| | | | |
|---|---|---|---|
| 150001 | 2/1953 | Australia | 49/449 |
| 473810 | 10/1937 | United Kingdom | 296/89 |

Primary Examiner—Russell D. Stormer
Assistant Examiner—Gary C. Hoge
Attorney, Agent, or Firm—Edward M. Livingston

[57] ABSTRACT

A dual windshield primarily for a golf cart or other slow moving vehicle having two panels (1, 3) with a top panel (1) slidable up-and-down in side channels (5) that are snap-attachable or otherwise fixable to front side posts (9). A top edge of the top panel (1) of the windshield is easily raised with a handle section (14, 22) that is snap-locked shut automatically with a snap-latch (13, 19) that is easily unsnapped.

31 Claims, 5 Drawing Sheets

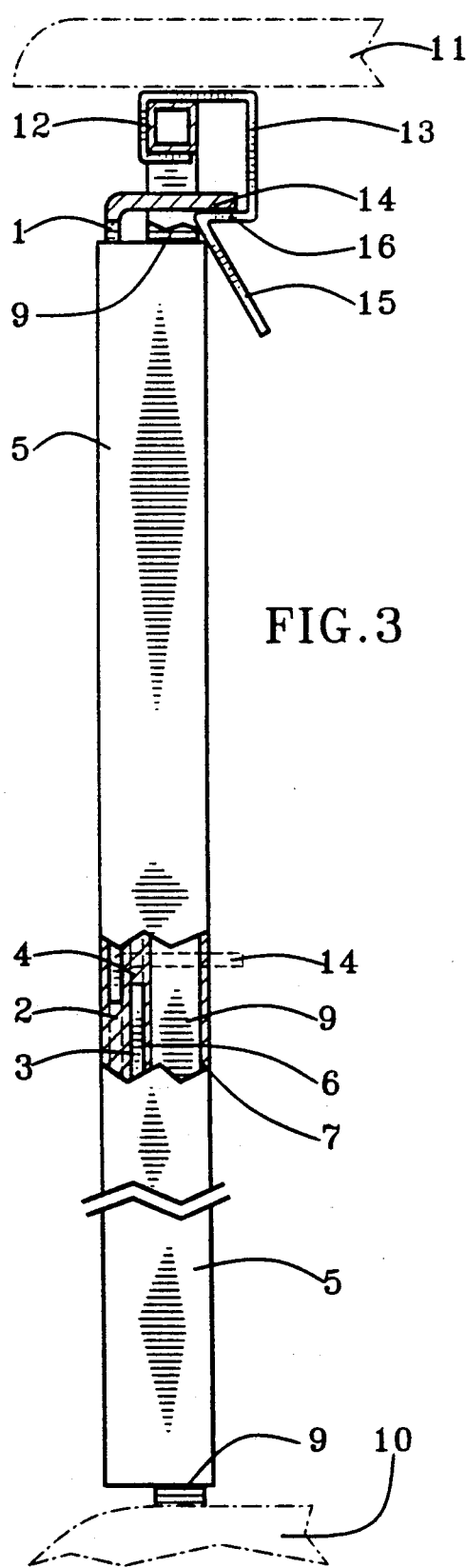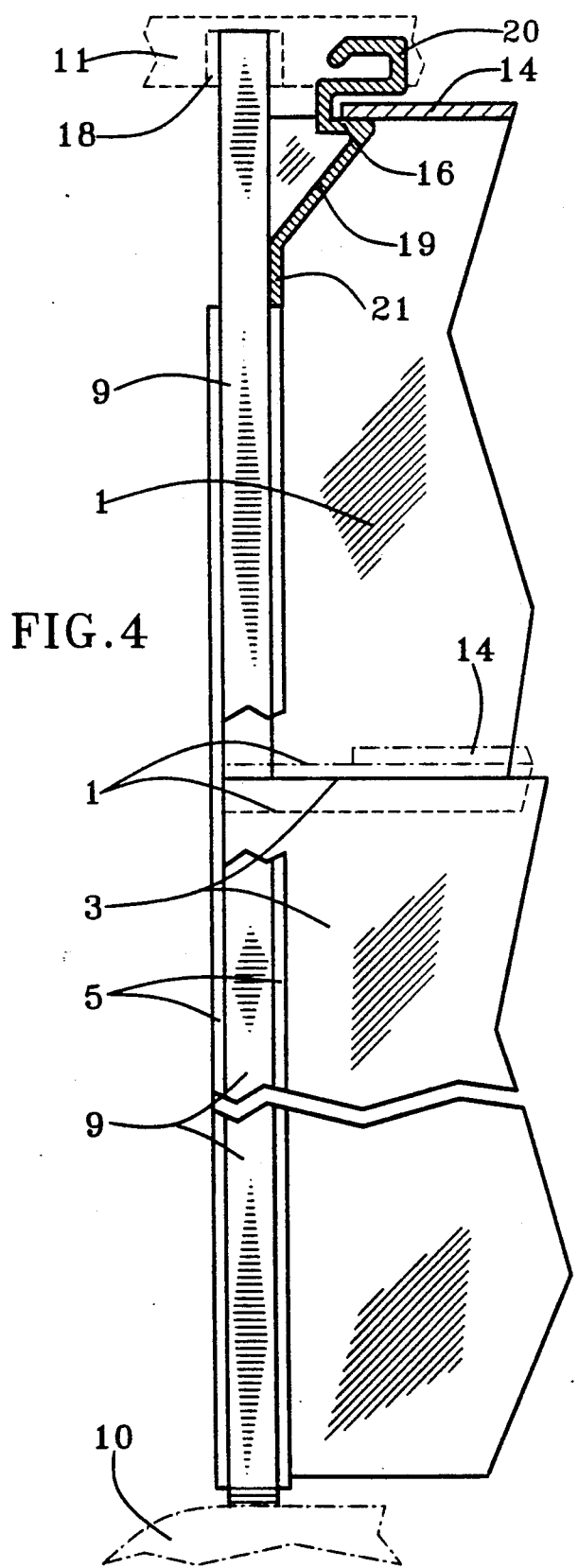

FIG.5
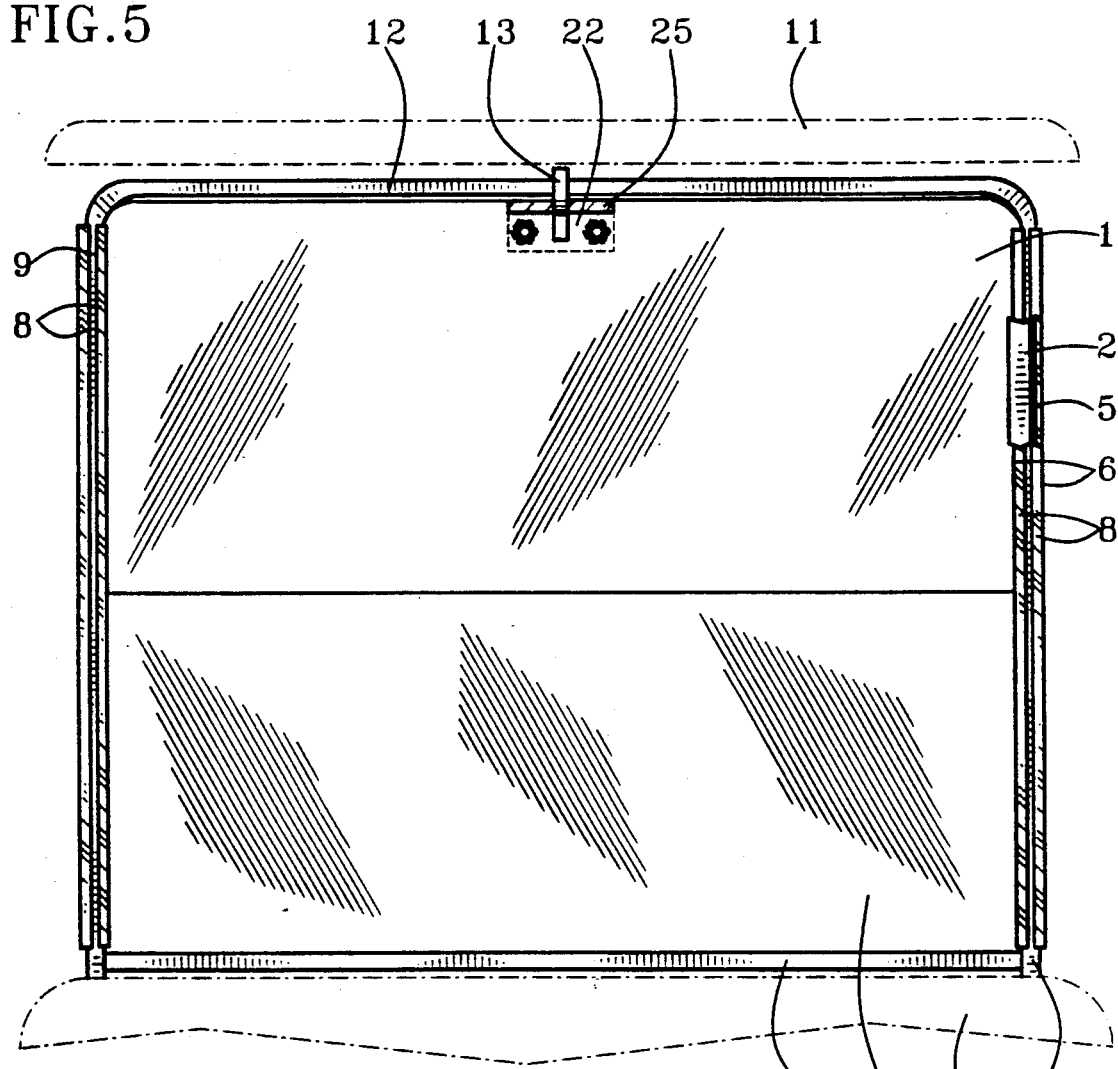
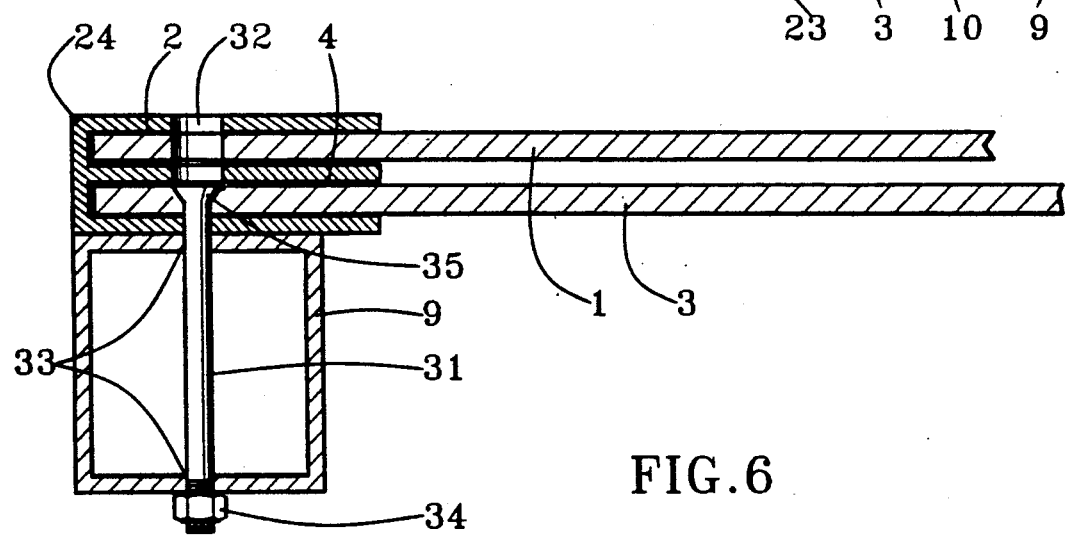
FIG.6

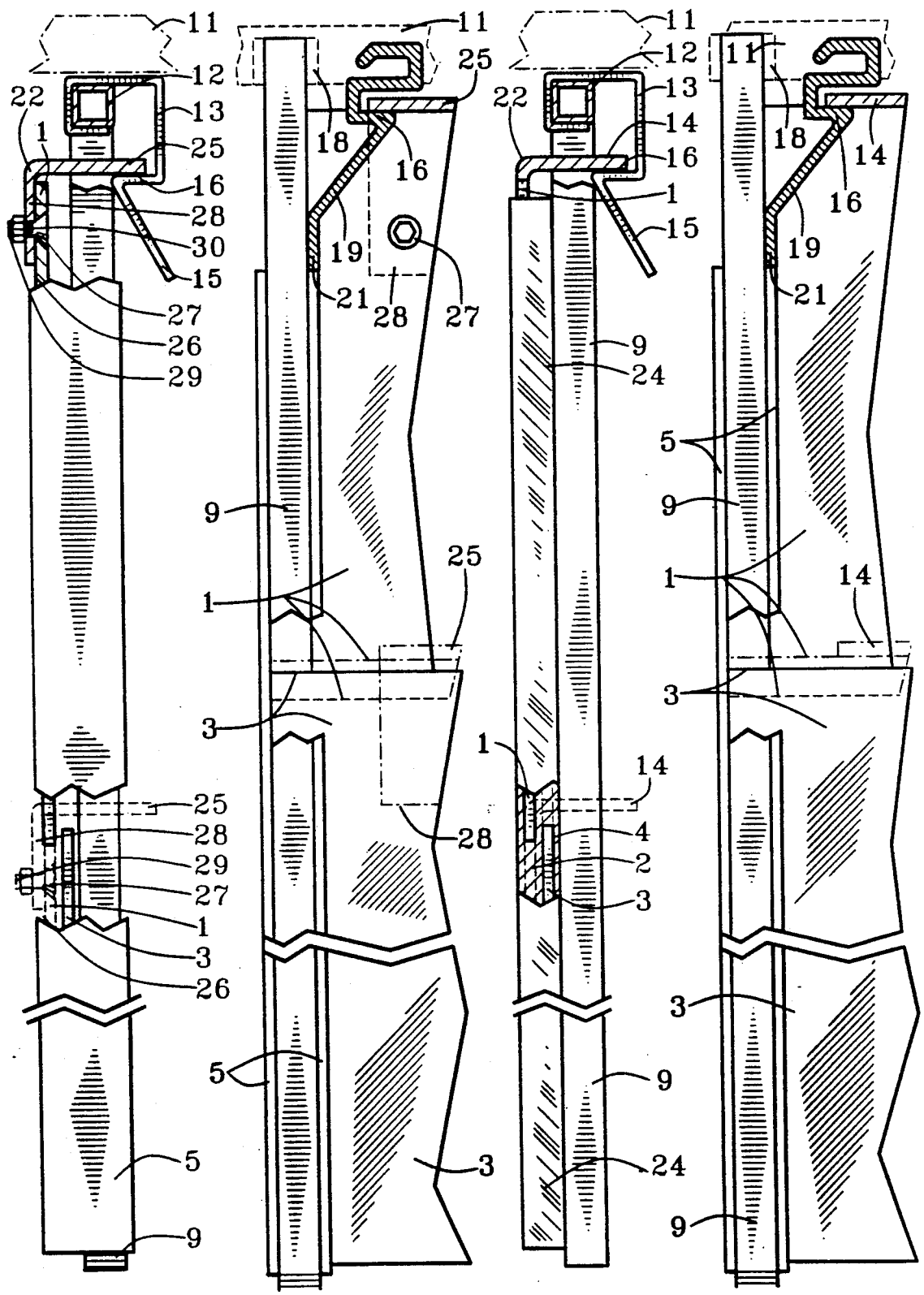

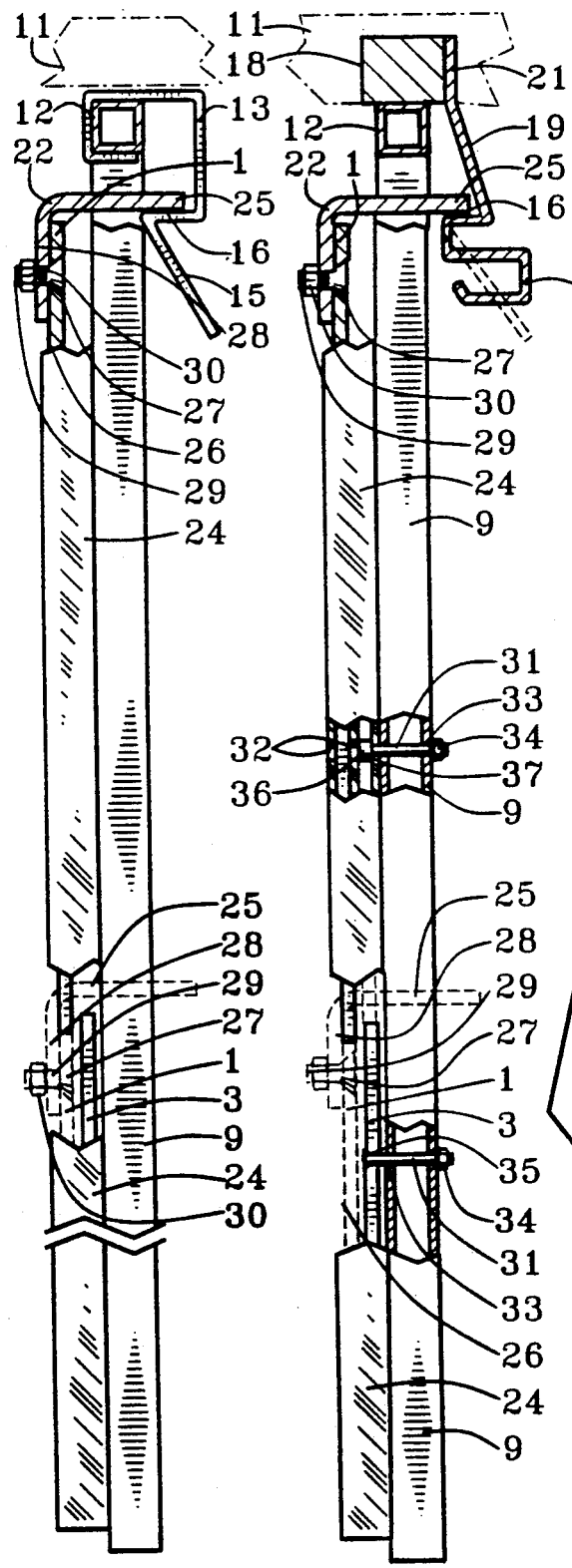
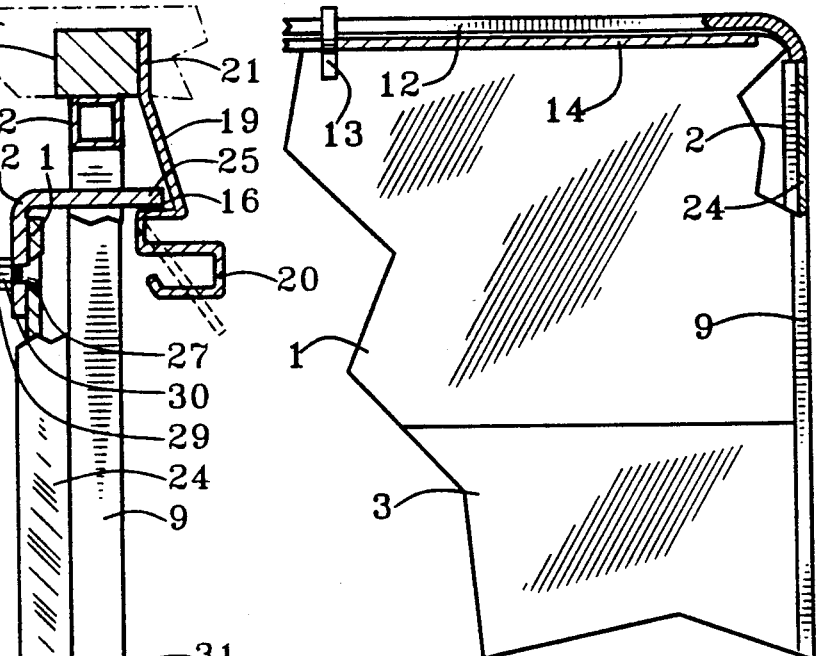
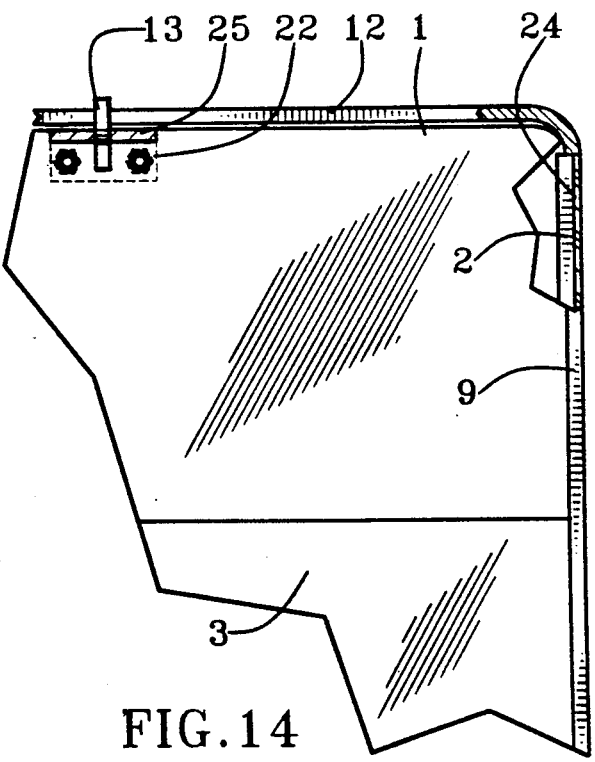
FIG. 11  FIG. 12  FIG. 13  FIG. 14

GOLF CART WINDSHIELD

BACKGROUND OF THE INVENTION

This invention relates to windshields for golf carts and other slow-moving vehicles such as industrial and construction equipment. In particular, it is a two-piece windshield with a top half being vertically-slidable in channels to be opened and closed.

There have been ventically-slidable windows in architectural structures since the fifteenth century. It was one of the first methods tried for car windshields in The early 1900's. A means for sliding has always included some type of channel for edges of windows or windshields. Before air-conditioning and high-speed vehicles, this practice was so common that the now little-used term "rabbet" described a common channel in which windows were slid up-and-down. This old art has been revived now for windshields of slow-moving vehicles to provide openness and airflow in the absence of air-conditioning.

Prior construction and working relationship of the windows to the channels and to vehicles in which they were used were different from this invention, however. The channels were built into structure of the vehicle rather than attachable as provided by this invention. Prior two-piece windshields were constructed differently and operated differently. Other types of openable windshields have employed hinging arrangements and other mechanisms.

Different, but pertinent prior art includes the following patent documents:

| Number | Date | Name | Classification |
|---|---|---|---|
| 4,792,175 | Dec. 20, 1988 | Gerber | 296/79 |
| 4,353,590 | Oct. 12, 1982 | Wei-Chuan | 296/78.1 |
| 4,072,338 | Feb. 7, 1978 | Lawrence | 296/28 C |
| 1,110,729 | Sept. 15, 1914 | Townsend | |

The Gerber patent described a two-piece windshield with a top portion being the same as a bottom portion to make them easy to stack when they were taken out and not used in good weather. Each section had an inwardly-bent top edge and an outwardly-bent bottom. They were held with removable fasteners. Although a two-piece windshield, it was not slidable channels nor held in vertical position as this invention. The two pieces of this invention can remain attached to the vehicle when open, rather than being taken off and stacked.

The Wei-Chuan patent taught a two-piece motorcycle windshield with sides of a top piece attached to rods which were slidable up-and-down. Edges of the windshield itself were not slidable in channels. Further different from this invention, it was locked in position at a bottom of the top piece.

The Lawrence patent pivotally attached a wind frame to an operator's cab and had windows slidable in the pivotal frame.

The Townsend patent had rack teeth and pinions to raise and lower a windshield.

SUMMARY OF THE INVENTION

One object of this invention is to provide a vertically-slidable two-piece windshield that can be attached conveniently to a wide variety of golf carts and other slow-moving vehicles.

Another object is to provide a windshield that opens at the top to allow breeze and air-flow from slow vehicle speeds to circulate at head height in a vehicle as a form of cooling and air-conditioning in warm weather.

Another object is to provide a windshield that can be opened and closed easily from the top without getting out of a vehicle.

Another object is to provide a windshield that can be locked shut automatically for maximum convenience when raised for protection from the elements.

Still another object is to provide a low-cost, long-lasting and maintenance-free windshield for golf carts and other vehicles for which physical aspects of operating conditions and construction are similar.

This invention accomplishes the above and other objects by providing a dual windshield having a top section slidable up-and-down in side channels that are snap-attachable to front side posts. A top edge of the top section of the windshield is easily raised with a handle section that is snap-locked shut automatically with a snap-latch that is easily unsnapped.

BRIEF DESCRIPTION OF THE DRAWINGS

This invention is described by appended claims in relation to a description of preferred embodiments with reference to the following drawings wherein:

FIG. 3 is a cutaway side view of the FIG. 1 illustration;

FIG. 4 is a cutaway front view of a snap-on-channel embodiment with a side latch;

FIG. 5 is a cutaway rear view of a snap-on-channel embodiment with an attachable handle and a rod latch;

FIG. 6 is a top sectional view of a post of a side-attached-channel embodiment of this invention;

FIG. 7 is a cutaway side view of the FIG. 1 embodiment with an attachable handle;

FIG. 8 is a cutaway front view of the FIG. 4 embodiment with an attachable handle;

FIG. 9 is a cutaway side view of a side-attachment-channel embodiment having a rod latch;

FIG. 10 is a cutaway front view of a side-attachment-channel embodiment having a side latch;

FIG. 11 is a cutaway side view of an embodiment having an attachable handle and a rod latch;

FIG. 12 is a cutaway side view of a side-attachment-channel embodiment having an attachable handle and a roof latch;

FIG. 13 is a sectional cutaway rear view of a corner of a side-attachment-channel embodiment having a rod latch; and FIG. 14 is a sectional cutaway rear view of a corner of a side-attachment embodiment having an attachable handle and a rod latch.

DESCRIPTION OF PREFERRED EMBODIMENTS

Figure 1:
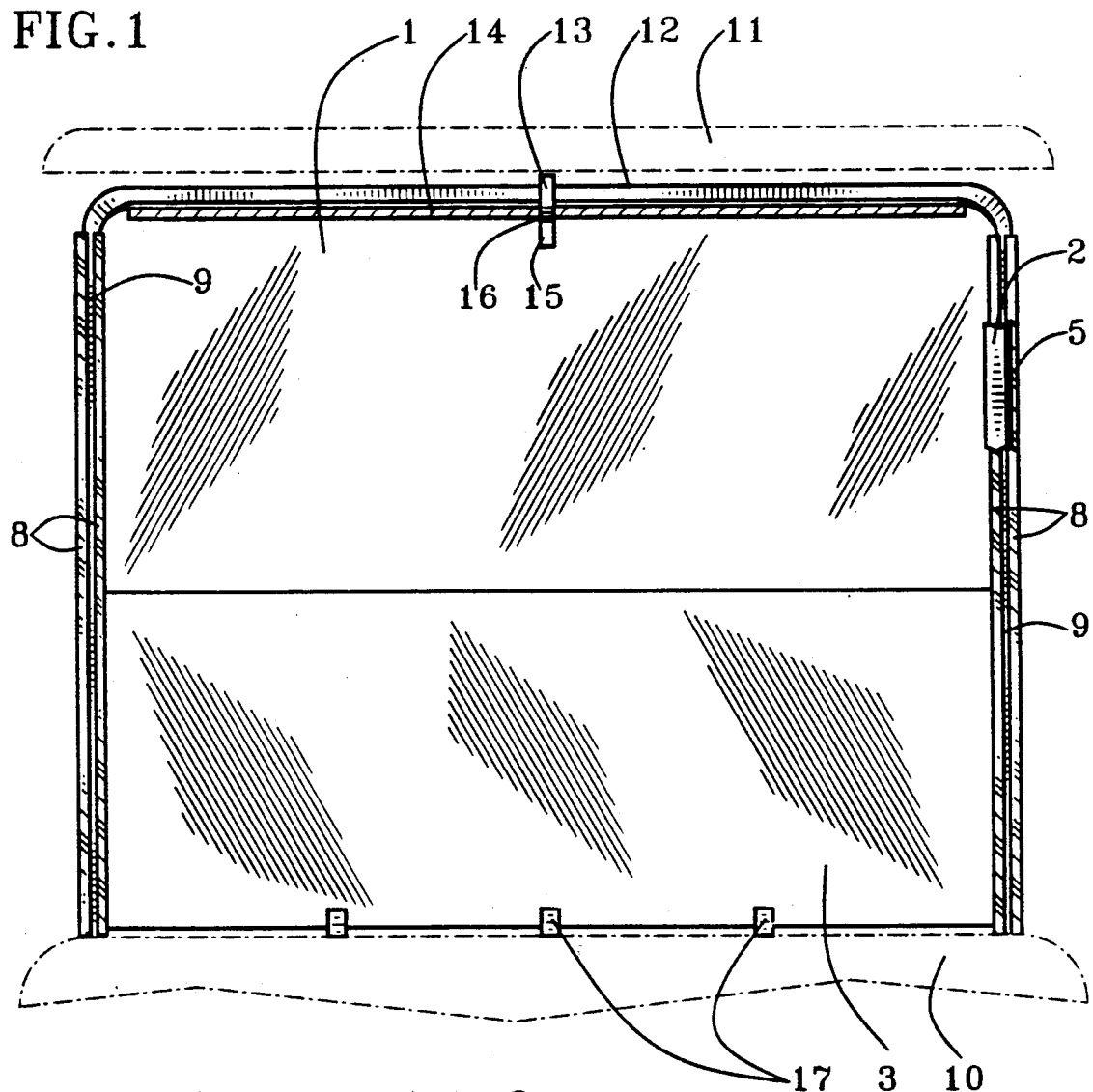
FIG. 1 is cutaway rear view of a snap-on-channel embodiment with a rod latch.
Figure 2:
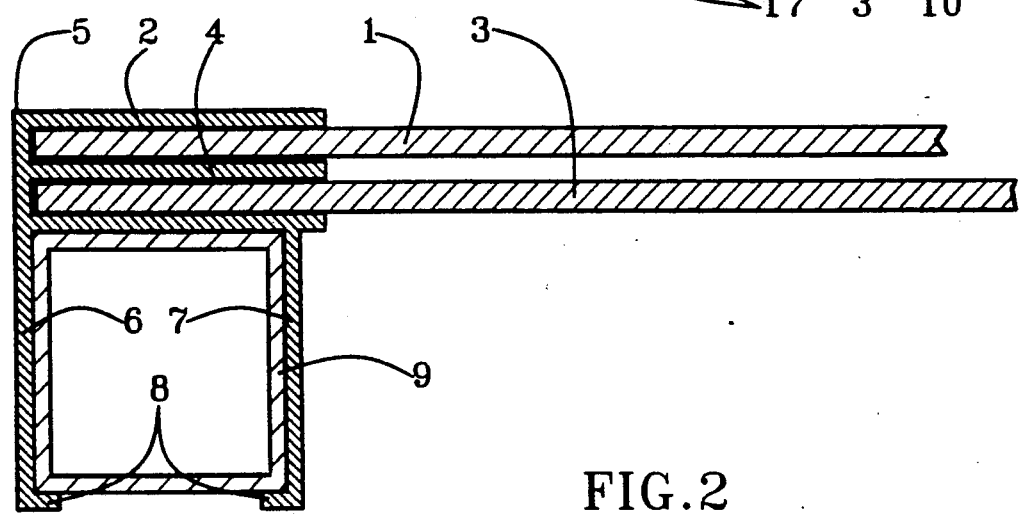
FIG. 2 is a top sectional view of a post of the FIG. 1 illustration.

Reference is made to FIGS. 1 and 2. A top panel 1 is slidable up-and-down in a top-panel channel 2 and a bottom panel 3 is attached in a down position in a bottom-panel channel 4 of a snap-on channel housing 5. The snap-on housing 5 has a snap-on leg 6 and an oppositely-disposed snap-on leg 7 with a snap-on hook 8 on each snap-on leg 6 and 7. The snap-on legs 6 and 7 and the snap-on hooks are snap-attachable to a windshield post 9 at each side of windshield panels 1 and 3. This embodiment of windshield attachment is particularly designed for use on golf carts having only side frames with no windshield top rod, such as those sold under the trademark of "Easy-Go".

Windshield posts 9 are attachable to a vehicle housing 10 as either original equipment or as add-on components below a roof 11. Both the vehicle housing 10 and the roof 11 are produced in a variety of forms.

The vehicle 10 and the roof 11 are not part of this invention. Instead, this invention is provided for adaptation to various types of vehicles 10 and such roof 11 as may or may not be involved. A windshield top rod 12 can be provided for vehicles 10 without a roof 11 having an adequate top member for this invention. A rod latch 13 is attachable to windshield top rod 12 where it is engageable with a bent-over windshield handle 14 when the top panel 1 is in a raised position.

Referring to FIGS. 1-3, the front panel 1 is down in an open position when the bent-over windshield handle 14 is at a midsection between the vehicle 10 and a roof 11. The top panel 1 is raised to a windshield-closed position by hand-lifting the bent-over windshield handle 14 upward vertically to where a latch bevel handle 15 is engaged and pushed rearward. It then springs back to where a latch base 16 then holds the top panel 1 in a closed position.

The rod latch 13 is constructed preferably of resilient material, such as spring steel, which is shaped to fit onto three sides of windshield top rod 12. This leaves an entranceway between insides of walls of the rod latch 13 for insertion of the windshield top rod 12. The rod latch 13 can be riveted or otherwise attached to the windshield top rod 12.

For lowering the top panel 1, the bent-over windshield handle 13 is hand-grasped and hand-lowered after fingers of a same hand or of a different hand are used to disengage the latch bevel handle 15. In the event that the top panel 1 is lowered too rapidly or is released to fall in its channel 2 to an abrupt contact with vehicle 10, resilient bumpers 17 shown in FIG. 1 can cushion any foreseeable fall.

Referring to FIG. 4, for those types of vehicles 10 with roofs 11 having forms of construction which interfere with access to prevent or otherwise restrict use of a windshield top rod 12, a side latch 19 can be attached to each windshield post 9. The latter construction is common to golf carts sold by Easy-Go Corporation. Like the rod latch 13, the side latch 19 can have a latch base 16 operable by a latch handle 20. An attachment leg 21 of side latch 19 can be riveted or otherwise attached to windshield post 9.

Referring to FIG. 5, an attachable handle 22 can be attached to a front face of the top panel 1 in place of the bent-over windshield handle 14. A windshield bottom rod 23 also can be utilized for those vehicles 10 which have structural features making such a rod 23 desirable for various reasons.

Referring to FIG. 6, a side-attachable channel housing 24 can be attached to a side of windshield posts 9 as desired or advantageous for adaptation to various types of vehicles 10. Adhesive or other attachment means can be employed.

Referring to FIG. 7, the attachable handle 22 can be provided with an L-extension 25 that is attachable to a front surface 26 of top panel 1 with a flathead socket bolt 27 or other attachment means. A front section 28 of the attachable handle 22, a bolt stem 29 and a fastener nut 30 are out of the way of bottom panel 3 in a down position or in any other position by means of their frontal location. The flathead socket bolt 27 can be countersunk into the top panel 1 to be out of the way of bottom panel 3 in a down position.

Referring to FIG. 8, the construction is the same as in FIG. 7 except for attachment of side latch 19 to windshield post 9 and the alternative latch handle 20.

Referring to FIG. 9, the construction is the same as in FIG. 3 except for side-attachable channel housing 24 which is attachable to a side of vehicle post 9 in place of snap-on channel housing 5.

Referring to FIG. 10, the construction is the same as for FIG. 4 except for side-attachable channel housing 24 which is attachable to a side of windshield post 9 in place of snap-on channel housing 5.

Referring to FIG. 11, the construction is the same as for FIG. 7 except for side-attachable channel housing 24 which is attachable to a side of vehicle post 9 in place of snap-on channel housing 5.

Referring now to FIGS. 12 and 6, the construction is primarily the same as for FIG. 8 except for side-attachable channel housing 24 which is attachable to a side of vehicle post 9 in place of snap-on channel housing 5. In addition, an optional means for attachment of side-attachable housing 24 to a side of vehicle post 9 is shown for FIGS. 9-12. In FIGS. 6 and 12, a flathead bolt 31 is insertable through access orifices 32 in channel housing 24 and through post-attachment orifices 33 to an opposite side of windshield post 9 where a fastener nut 34 can be attached. Countersinking of the head 35 of flathead bolt 31 in bottom panel 3 positions the side-attachable housing 24 and the bottom channel 4 onto windshield posts 9 with the bolt head 35 out of the path of top panel 1. One of such flathead bolts 31 can be positioned proximate bottom and top sections of each side of bottom panel 3. In a top portion of the side-attachable housing 24 where there is no bottom panel 3, round-headed or straight-walled bolts 36 with flat shoulders 37 can be used. At least two straight-walled bolts 36 should be used at each side of the side-attachable channel housing 24 in a top-panel portion of the windshield posts 9.

Referring to FIG. 13, the structure is the same as for FIG. 1 except for side-attachable channel housing 24 which is attachable to windshield post 9 in place of snap-on channel housing 5.

Referring to FIG. 14, the structure is the same as for FIG. 5 except for side-attachable channel housing 24 which is attachable to windshield post 9 in place of snap-on channel housing 5.

A new and useful golf cart dual windshield having been described. all such modifications, adaptations, substitutions of equivalents, applications and forms thereof as described by the following claims are included in this invention.

I claim:

1. A dual windshield having:
    a bottom panel attachable to a side windshield column at each side of the bottom panel;
    a top panel slidable up-and-down in a channel having walls attachable to a side column at each side of the top panel;
    an inwardly-projecting handle on a top of the top panel; and
    a panel latch attachable to a frame member at a top of the windshield;

the panel latch being snap-latchable onto the inwardly-projecting handle with the top panel in a raised position.

2. A dual windshield according to claim 1 and further comprising:
   a snap-fit channel on an outside wall of a channel in which the top panel is slidable up-and-down at each side of the top panel; and
   L-hooks on linear wall entrances to each snap-fit channel;
   each snap-fit channel being sized and shaped to fit snugly onto a windshield column at each side of the top panel.

3. A dual windshield according to claim 2 wherein the panel latch attachable to the frame member at the top of the windshield is a resilient strap formed to fit onto at least three sides of a rectangular top frame member and having an inwardly-projecting top leg of the resilient strap bent first downwardly a select distance, then bent outwardly a select distance to fit under the inwardly-projecting handle with the top panel in a raised position and finally bent at an angle downwardly and inwardly in bevelled-latch relationship to the inwardly-projecting handle.

4. A dual windshield according to claim 2 wherein the panel latch attachable to the frame member near the top of the windshield is a resilient strap attachable to an inside wall of a side post member and bent at an angle upwardly and outwardly, then bent inwardly in a latch-platform relationship to the inwardly-projecting handle at a distance from a top end of the strap which positions the latch-platform relationship at a bottom edge of the inwardly-projecting handle with the top panel in a raised position.

5. A dual windshield according to claim 1 wherein the inwardly-projecting handle is a right-angle bend on a top edge of the top panel.

6. A dual windshield according to claim 3 wherein the inwardly-projecting handle is an inwardly projecting member attachable to a section of the top edge of the top panel proximate contact of the panel latch attachable to a frame member at a top of the windshield with the top panel in a raised position.

7. A dual windshield according to claim 4 wherein the inwardly-projecting handle is a right-angle bend on a top edge of the top panel.

8. A dual windshield according to claim 4 wherein the inwardly-projecting handle is an inwardly projecting member attachable to a section of the top edge of the top panel, proximate contact of the panel latch attachable to a frame member at a top of the windshield with the top panel in a raised position.

9. A dual windshield according to claim 1 and further comprising:
   a snap-fit channel on an outside wall of an inside channel of a dual channel in which the bottom panel is positioned with a common wall to an outside channel of the dual channel in which the top panel is slidable up-and-down at each side of the top and bottom panels; and
   L-hooks on linear wall entrances to each snap-fit channel;
   each snap-fit channel being sized and shaped to fit snugly onto a windshield column at each side of the top panel.

10. A dual windshield according to claim 9 wherein the panel latch attachable to the frame member at the top of the windshield is a resilient strap formed to fit onto at least three sides of a rectangular top frame member and having an inwardly-projecting top leg of the resilient strap bent first downwardly a select distance, then bent outwardly a select distance to fit under the inwardly-projecting handle with the top panel in a raised position and finally bent at an angle downwardly and inwardly in bevelled-latch relationship to the inwardly-projecting handle.

11. A dual windshield according to claim 9 wherein the panel latch attachable to the frame member at the top of the windshield is a resilient strap attachable to a side wall of a roof structure member and bent at an angle downwardly and inwardly, then bent outwardly in a latch-platform relationship to the inwardly-projecting handle at a distance from a top end of the strap which positions the latch-platform relationship at a bottom edge of the inwardly-projecting handle with the top panel in a raised position.

12. A dual windshield according to claim 10 wherein the inwardly-projecting handle is a right-angle bend on a top edge of the top panel.

13. A dual windshield according to claim 10 wherein the inwardly-projecting handle is an inwardly projecting member attachable to a section of the top edge of the top panel proximate contact of the panel latch attachable to a frame member at a top of the windshield with the top panel in a raised position.

14. A dual windshield according to claim 11 wherein the inwardly-projecting handle is a right-angle bend on a top edge of the top panel.

15. A dual windshield according to claim 11 wherein the inwardly-projecting handle is an inwardly-projecting member attachable to a section of the top edge of the top panel proximate contact of the panel latch attachable to a frame member at a top of the windshield with the top panel in a raised position.

16. A dual windshield having:
   a windshield frame including side windshield columns attachable to a front section of a low-speed vehicle;
   a frame top extended between top portions of the side windshield columns;
   a bottom panel attachable to a side windshield column at each side of the bottom panel;
   a top panel slidable up-and-down in a channel having walls attachable to a side column at each side of the top panel; and
   an inwardly-projecting handle on a top of each top panel;
   a panel latch attachable near the frame top, the panel latch being snap-latchable onto the inwardly-projecting handle with the top panel in a raised position.

17. A dual windshield according to claim 16 and further comprising:
   a snap-fit channel on an outside wall of a channel in which the top panel is slidable up-and-down at each side of the top panel; and
   L-hooks on linear wall entrances to each snap-fit channel;
   each snap-fit channel being sized and shaped to fit snugly onto the windshield column at each side of the top panel.

18. A dual windshield according to claim 16 wherein the panel latch attachable near the frame top is a resilient strap formed to fit onto at least three sides of the frame top and having an inwardly-projecting top leg of the resilient strap bent first downwardly a select distance, then bent outwardly a select distance to fit under the inwardly-projecting handle with the top panel in a raised position and finally bent at an angle downwardly and inwardly in bevelled-latch relationship to the inwardlyprojecting handle.

19. A dual windshield according to claim 16 wherein the panel latch attachable near the frame top is a resilient strap attachable to a side post of the frame top and bent at a angle upwardly and outwardly, then bent inwardly in a latch-platform relationship to the inwardly-projecting handle at a distance from a top end of the strap which positions the latch-platform relationship at a bottom edge of the inwardly-projecting handle with the top panel in a raised position.

20. A dual windshield according to claim 18 wherein the inwardly-projecting handle is a right-angle bend on a top edge of the top panel.

21. A dual windshield according to claim 18 wherein the inwardly-projecting handle is an inwardly-projecting member attachable to a section of the top edge of the top panel proximate contact of the panel latch attachable to a frame member at a top of the windshield with the top panel in a raised position.

22. A dual windshield according to claim 19 wherein the inwardly-projecting handle is a right-angle bend on a top edge of the top panel.

23. A dual windshield according to claim 18 wherein the inwardly-projecting handle is an inwardly projecting member attachable to a section of the top edge of the top panel.

24. A dual windshield according to claim 16 and further comprising;
a snap-fit channel on a outside wall of an inside channel of a dual channel in which the bottom panel is positioned with a common wall to an outside channel of the dual channel in which the top panel is slidable up-and-down at each side of the top and bottom panels; and
L-hooks on linear wall entrances to each snap-fit channel;
each snap-fit channel being sized and shaped to fit snugly onto the windshield column at each side of the top panel.

25. A dual windshield according to claim 24 wherein the panel latch attachable near the frame top is a resilient strap formed to fit onto at least three sides of the frame top and having an inwardly-projecting top leg of the resilient strap bent first downwardly a select distance, then bent outwardly a select distance to fit under the inwardly-projecting handle with the top panel in a raised position and finally bent at an angle downwardly and inwardly in bevelled-latch relationship to the inwardly-projecting handle.

26. A dual windshield according to claim 24 wherein the panel latch attachable near the frame top is a resilient strap attachable to a side post of the frame top and bent at an angle upwardly and outwardly, then bent inwardly in a latch-platform relationship to the inwardly-projecting handle at a distance from a top end of the strap which positions the latch-platform relationship at a bottom edge of the inwardly-projecting handle with the top panel in a raised position.

27. A dual windshield according to claim 25 wherein the inwardly-projecting handle is a right-angle bend on a top edge of the top panel.

28. A dual windshield according to claim 25 wherein the inwardly-projecting handle is an inwardly projecting member attachable to a section of the top edge of the top panel.

29. A dual windshield according to claim 26 wherein the inwardly-projecting handle is a right-angle bend on a top edge of the top panel.

30. A dual windshield according to claim 26 wherein the inwardly-projecting handle is an inwardly projecting member attachable to a section of the top edge of the top panel.

31. A dual windshield according to claim 1 and further comprising:
a frame bottom extended between bottom ends of the windshield columns.

* * * * *